(12) United States Patent
Chen et al.

(10) Patent No.: US 11,553,506 B2
(45) Date of Patent: Jan. 10, 2023

(54) MULTI-RADIO COEXISTENCE AWARE INTELLIGENT WIFI DATA AGGREGATION

(71) Applicant: Apple Inc., Cupertino, CA (US)

(72) Inventors: Camille Chen, Cupertino, CA (US); Nohee Ko, Mountain View, CA (US); Sanjay Mani, Cupertino, CA (US); Sudhanshu John, Cupertino, CA (US); William F. Healey, Cupertino, CA (US); Yang Yu, Redwood City, CA (US)

(73) Assignee: APPLE INC., Cupertino, CA (US)

( * ) Notice: Subject to any disclaimer, the term of this patent is extended or adjusted under 35 U.S.C. 154(b) by 257 days.

(21) Appl. No.: 16/926,590

(22) Filed: Jul. 10, 2020

(65) Prior Publication Data
US 2022/0015112 A1    Jan. 13, 2022

(51) Int. Cl.
*H04W 4/00* (2018.01)
*H04W 72/12* (2009.01)
*H04B 1/00* (2006.01)
*H04W 28/06* (2009.01)
*H04W 4/80* (2018.01)
*H04W 88/06* (2009.01)

(52) U.S. Cl.
CPC ...... *H04W 72/1215* (2013.01); *H04B 1/0053* (2013.01); *H04W 4/80* (2018.02); *H04W 28/065* (2013.01); *H04W 72/1231* (2013.01); *H04W 88/06* (2013.01)

(58) Field of Classification Search
None
See application file for complete search history.

(56) References Cited

U.S. PATENT DOCUMENTS

| 8,363,578 B1* | 1/2013 | Ramamurthy | ........ H04W 28/20 370/310 |
|---|---|---|---|
| 2016/0219589 A1* | 7/2016 | Khawer | ................ H04W 24/02 |
| 2018/0091929 A1* | 3/2018 | Bi | ........................... H04W 4/80 |
| 2018/0145919 A1* | 5/2018 | Kalikot Veetil | ...... H04L 5/0094 |
| 2019/0052346 A1* | 2/2019 | Yu | ........................ H04B 7/1555 |

* cited by examiner

*Primary Examiner* — Zewdu A Beyen
(74) *Attorney, Agent, or Firm* — Kilpatrick Townsend & Stockton

(57) ABSTRACT

A mobile computing device is configured to dynamically aggregate wireless communications on a common antenna. The device determines that a WiFi communication in a first frequency band is associated with an antenna, the WiFi communication having a number of assigned transmission time slots. The device determines that a second wireless communication in a second frequency band also is associated with the antenna, and determines a periodicity and/or a media quality of the second wireless communication. Based on the periodicity and/or media quality of the second wireless communication, the device aggregates the WiFi communication and the second wireless communication, the aggregation comprising assigning a number of packets of the second wireless communication to an aggregation frame of a plurality of frames associated with the transmission time slots assigned to the WiFi communication.

18 Claims, 6 Drawing Sheets

| Wi-Fi Link Conditions | | Wi-Fi Performance with eSCO + BT HID (Trackpad) Wi-Fi Medium Interference Level ~ 20% | |
|---|---|---|---|
| Wi-Fi RSSI (dBm) | FaceTime (FT) Video Stall% Acceptable Threshold | FT Video Stall% (No Wi-Fi Aggregation) | FT Video Stall% (Wi-Fi Limited Aggregation Enabled) |
| -45 | 6% | 8.4% | 0.4% |
| -65 | 6% | 11.7% | 1.2% |
| -45 | 6% | 15.6% | 3.8% |

FIG. 5

MULTI-RADIO COEXISTENCE AWARE INTELLIGENT WIFI DATA AGGREGATION

TECHNICAL FIELD

The subject matter described herein relates to wireless communication, including to multi-radio coexistence-aware intelligent WiFi data aggregation.

BACKGROUND

For small form factor mobile computing devices with radio communication capabilities (referred to herein generally as "radios"), such as smart phones, tablets, smart watches, etc., shared hardware (HW)/radio frequency (RF) resources such as WiFi and Bluetooth (BT) antennas, front-end module (FEM) and low antenna isolation usually require a coexistence scheme such as TDD (time-division duplexing) is required, such as when both WiFi and BT are operating in the same frequency.

Such a coexistence scheme generally works if a small form factor mobile computing device has only one BT device active, such as, for example, a BT headset engaged in Advanced Audio Distribution Profile (A2DP) audio streaming. In this example, A2DP audio has data buffers and latency tolerance, and therefore a WiFi radio in a computing device can communicate with an access point (AP), such as a router, repeater, or other hardware device for WiFi networking communication, before granting BT communications. However, with a larger form factor, higher computation power, bigger storage, larger screen and multi-task features, newer mobile devices are catching up to traditional desktop computers in features and performance. Further, more users prefer mobile devices to desktop computers or laptop computers where mobile devices can deliver similar performance in application execution and superior performance in communications.

Users have become accustomed to using multiple wireless peripherals with desktop or portable PCs, and when users use a mobile device such as a tablet, a smart phone, or a smart watch, they demand similar functionality and performance. For example, with a docking station, users expect that tablets can connect with a BT mouse/trackpad, keyboard, and/or pencil while simultaneously using a BT headset for voice calls or music streaming. While desktop and portable PCs provide a large form factor for accommodating shared HW/RF resources, where WiFi and BT can provide parallel operations in the same frequency without interfering each other. However, it has generally been impossible for a small device such as a tablet or phone to provide similar parallel operations.

FIG. 1 shows an exemplary modern use case for a mobile computing device 102, i.e. a tablet computer such as an iPad or a smart phone, such as an iPhone, in which the mobile computing device 102 is expected to connect wirelessly with a variety of peripheral devices, such as a smart pencil, a keyboard, a mouse/trackpad, a BT/BT low energy (BTLE) headset for voice or music, and the like. The mobile computing device 102 can also connect with a home electronic appliances control system, such as a HomeKit (HK) by Apple®, via BTLE or other technologies using a low power wireless mesh networking protocol such as Thread®. The mobile computing device 102 may also need to connect wirelessly with various other accessories such as tracking tags or tiles.

Over the years, empirical data has shown that in order to achieve stable WiFi performance in 2.4 GHz when BT voice with enhanced Synchronous Connection-Oriented (eSCO) is on, such as used in a video call such as a face time (FT) call, a WiFi call, or the like, a simple implementation is to turn off WiFi aggregation and use a "clear to send" (CTS) protocol such as CTS2S to reserve time for BT, under the assumption that only one BT device is in use, and a BT headset (HS) is being used.

BT voice usually requires 1.25 ms/7.5 ms for respective data Tx/Rx. If it has retransmission, BT voice will require an extra 1.25 ms/7.5 ms. FIG. 2 shows a WiFi/BT eSCO, time division duplex (TDD) time sharing scheme, and how WiFi and BT time slots are arranged. BT eSCO can occupy up to 1.25 ms*2=2.5 ms, whereas WiFi can use 5-6.25 ms. With this scheme, even WiFi has 2×2 streams, and with a strong received signal strength indicator (RSSI) of, say >=−60 dBm, the WiFi can achieve a baseline of >=100 Mbps. With aggregation off and BT voice coexistent, WiFi usually can only achieve <=25 Mbps. With one BT HS in use, such communication speeds are sufficient. However, once users add other BT peripherals such as a smart pencil, a keyboard and/or a mouse/trackpad, WiFi performance can suffer significantly. Besides BT voice, which has short intervals between packets, other BT devices, such as a game controller (GC), also utilize 7.5 ms intervals, and Bluetooth Low Energy (BTLE) for LE Audio (LEA) can have short intervals for the audio traffic as well.

Further, conventional mobile computing devices feature more radios for other RF communication types and protocols such as UltraWide Band (UWB) and Thread®. WiFi 5-6 GHz needs to coexist with UWB in the 6-8 GHz band, while WiFi and Thread® need to coexist in the 2.4-2.48 GHz band, as Thread® also uses the 2.4 GHz ISM band, as long as UWB or Thread® has regular, short intervals of wireless traffic. Further, WiFi/BT coexistence can be challenging when BT has real-time short interval traffic, such as with voice eSCO, LEA, or a GC.

Accordingly, there is a need for new coexistence techniques among wireless computing and communication devices.

SUMMARY

This document describes a system and method for multi-radio, coexistence aware, intelligent WiFi data aggregation. With a limited aggregation feature, WiFi performance is significantly improved. Combined with BT clustering techniques, in which a number of BT packets are combined together to report to a WiFi radio, mobile devices can deliver acceptable WiFi performance even while connected with multiple BT devices.

In some aspects of this disclosure, a mobile computing device is configured to dynamically aggregate wireless communications on a common antenna. A processor of the device determines that a WiFi communication in a first frequency band is associated with an antenna, the WiFi communication having a number of assigned transmission time slots. The processor determines that a second wireless communication in a second frequency band also is associated with the antenna, and determines a periodicity and/or a media quality of the second wireless communication. Based on the periodicity and/or media quality of the second wireless communication, the processor aggregates the WiFi communication and the second wireless communication, the aggregation comprising assigning a number of packets of the second wireless communication to an aggregation frame of a plurality of frames associated with the transmission time slots assigned to the WiFi communication.

Implementations of the current subject matter can include, but are not limited to, methods consistent with the descriptions provided herein as well as articles that comprise a tangibly embodied machine-readable medium operable to cause one or more machines (e.g., computers, mobile devices, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 5 illustrates an example of effects of simultaneous BT eSCO and Human Interface Device (HID) protocol communications traffic with a trackpad on a video call user experience over a 2.4 Ghz WiFi link.

When practical, similar reference numbers denote similar structures, features, or elements.

DETAILED DESCRIPTION

Figure 1:
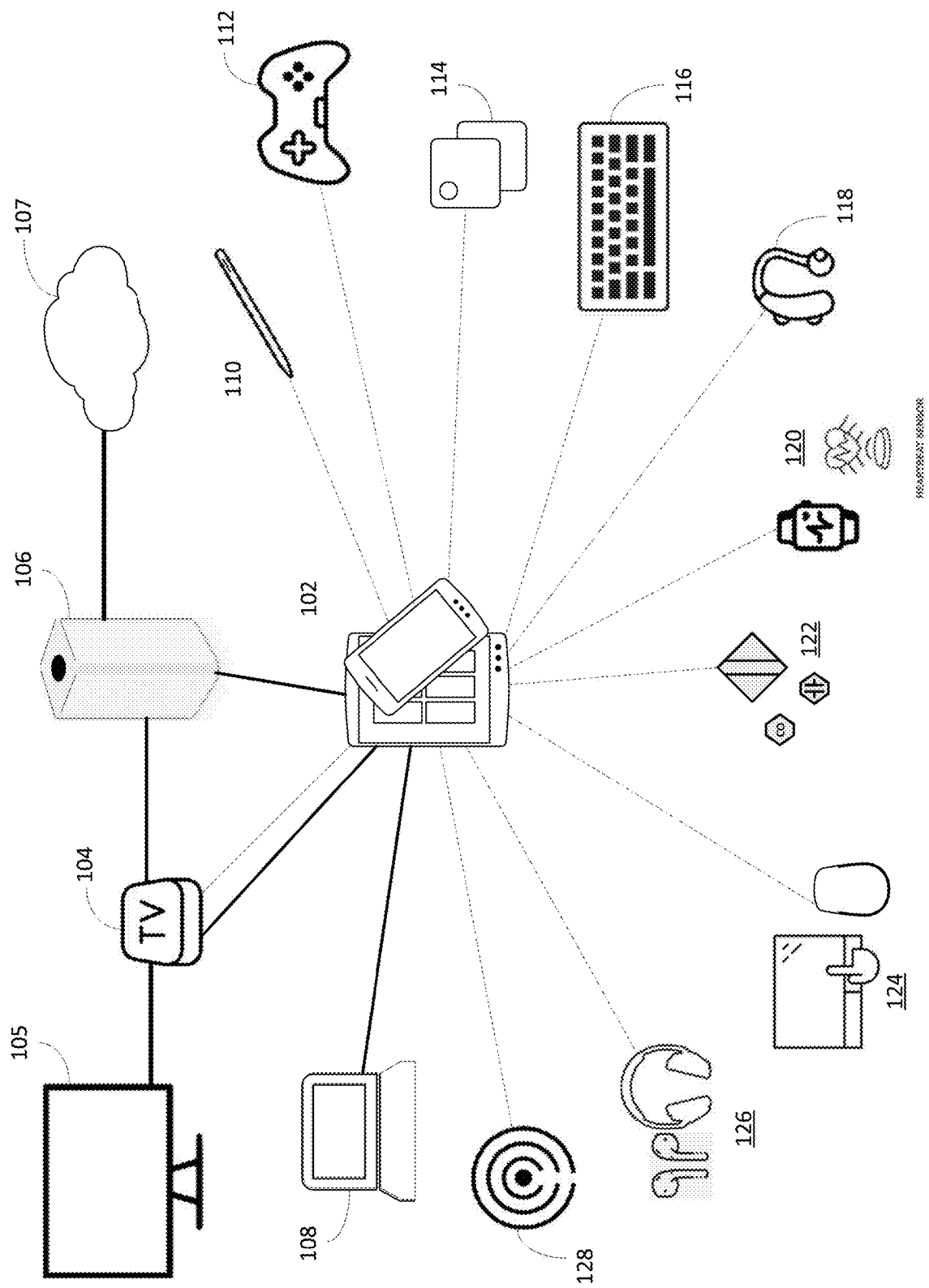
FIG. 1 shows an exemplary use case for wireless communications with a modern tablet computer.
Figure 2:
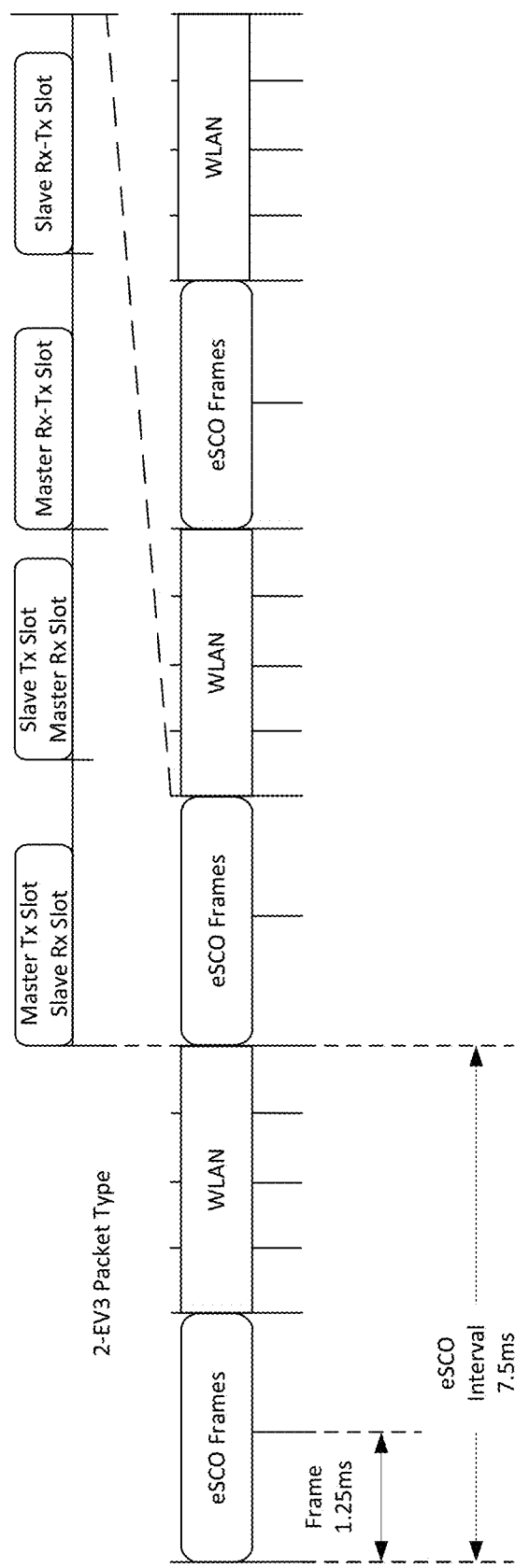
FIG. 2 is an example timing diagram illustrating WiFi/BT eSCO TDD scheduling.
Figures 3A, 3B:
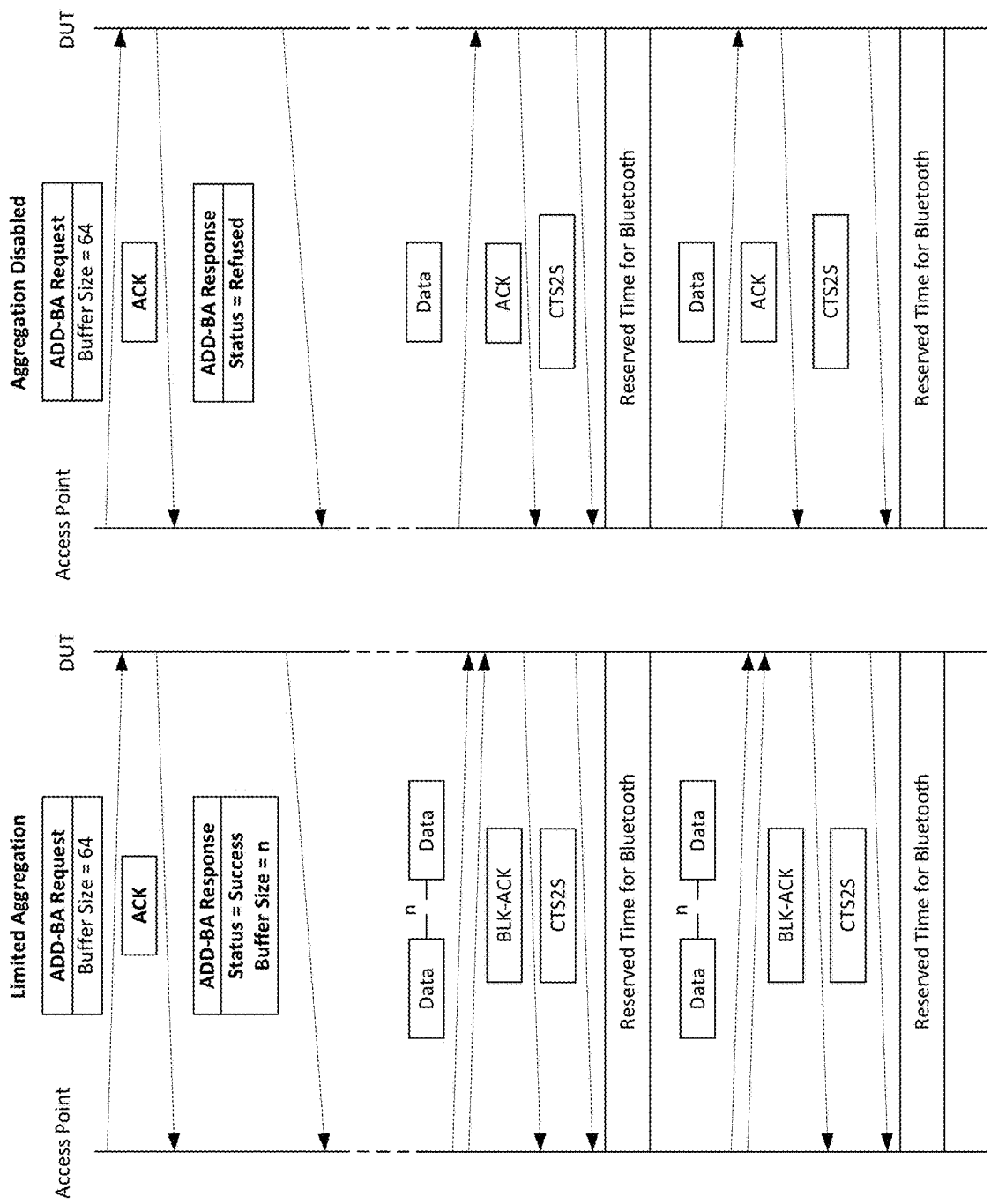
FIG. 3A and FIG. 3B several examples of WiFi communication with limited aggregation.

This document describes a system and method for multi-radio coexistence aware intelligent WiFi data aggregation. In accordance with some implementations, a system and method provide a limited aggregation feature, combined with BT clustering techniques, in which a number of BT packets are combined together to report to a WiFi radio, such that mobile devices can deliver acceptable WiFi performance even while connected with multiple BT devices FIGS. 3A and 3B depicts WiFi operation of a mobile computing device with limited aggregation. In accordance with implementations described herein, instead of denying aggregation requested from an access point (AP) as shown in FIG. 3A, the device will agree with aggregation, however, it will propose the size of aggregation based on the WiFi/BT coexistence policy, as shown in FIG. 3B. For example, the AP may request 64 packets in an aggregation frame, and the device may reply with n=10 if it calculates that can fit into the slots assigned to WiFi communications.

Figure 4:
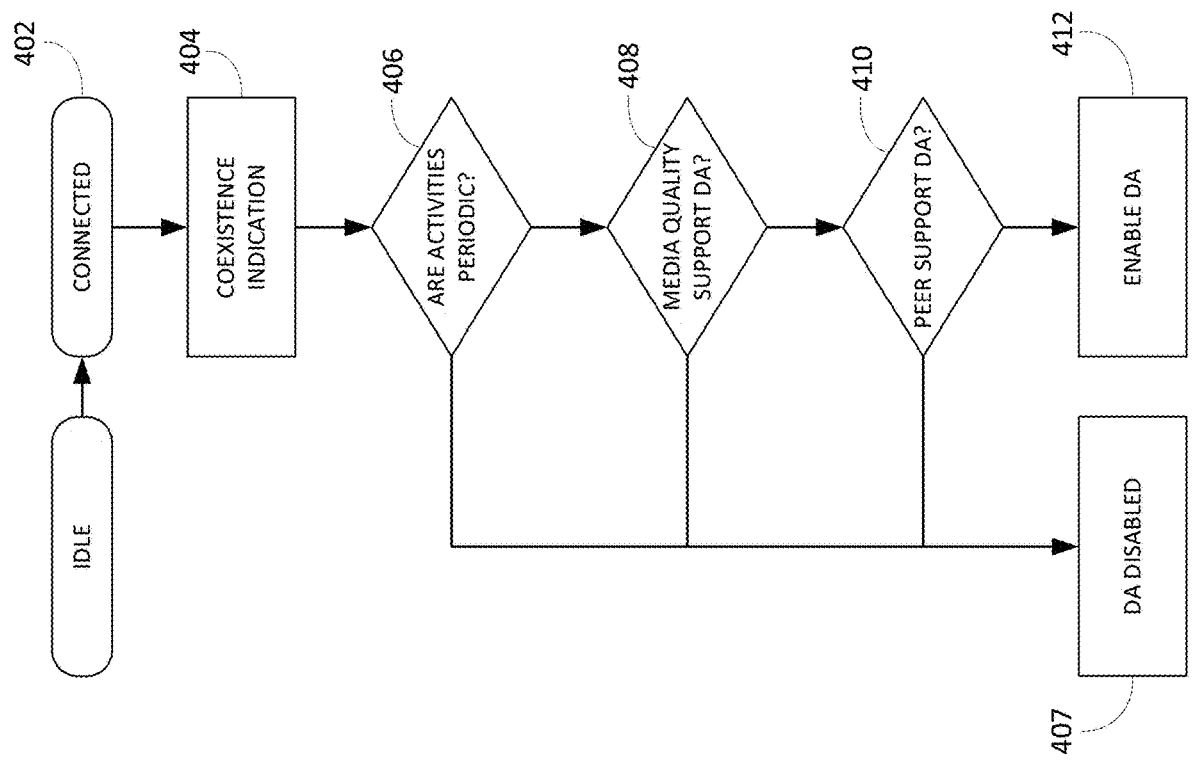
FIG. 4 is an example flowchart showing further detail of a limited aggregation decision.

FIG. 4 is a flowchart showing further detail of limited aggregation for a mobile computing device. The "n" shown in FIG. 3A is decided with multiple inputs as shown in FIG. 4. For example, depending on how much time is allocated to WiFi, WiFi RSSI, and/or environment noise, etc., the mobile computing device will calculate the proper size of a transmission and report to the AP. The process flow shown in FIG. 4 is mainly applicable to a WiFi receive (Rx) case; for WiFi transmission (Tx), the mobile computing device has more freedom as it can calculate how much time to allocate to WiFi Tx, and will dynamically decide aggregation size. Accordingly, this document focuses more on the WiFi Rx case, which is more widely used in a mobile device and far more challenging to get high performance, as the AP decides Tx size, rate, etc.

At 402, it is determined whether any WiFi connections are present, and if so, whether they are of a certain frequency, such as 2.4 GHz or 5-6 GHz or up to 60 GHz. The step can also determine an infrastructure of the WiFi connection, and whether the connection is adhoc, peer-to-peer, on a mesh network, or the like. At 404 a coexistence is determined, i.e. whether another wireless technology begins in the same frequency band or close enough to share antennas, such as Bluetooth, UWB, Thread, LTE, etc.

At 406, it is determined whether the communications are periodic, i.e., whether the communication activities are deterministic with some periodicity, and if not, DA is disabled. For instance, the method determines whether the interval is reasonably short so that WiFi can use aggregation, depending on the coexisting communication technology. If yes, at 408, it is determined whether media quality is sufficient for dynamic aggregation. For example, the system determines whether RSSI>65 dBm, whether SRN>25 dBm, and/or CCA<30%. If not, DA is disabled. If yes, at 410 it is determined whether the network infrastructure can support dynamic aggregation, i.e. whether the infrastructure can negotiate aggregation size with the AP using ADDPA. If so, DA is enabled.

FIG. 5 shows WiFi performance with eSCO with BT HID of a trackpad, and the impact of having simultaneous BT eSCO and HID (trackpad) traffic on a FaceTime user experience over a 2.4 Ghz WiFi link. In this use case, the trackpad takes up additional airtime of up to 2.5 ms every 7.5 ms. This leaves only 3.75 ms out of every 7.5 ms for WiFi operations (eSCO takes up 1.25 ms/7.5 ms), and more significantly constitutes two separate sets of frequent interruptions for WiFi antenna usage. With aggregation turned off, this results in very inefficient usage of the medium by the WiFi radio, along with constant rate drops from the sender AP side, since the medium cannot always be reserved with a serial "clear to send to self" (CTS2Self) message frame transmission, since the BT eSCO and HID requests are high priority and generated within milliseconds of each other.

A videotelephony or video call application, such as FaceTime (FT), is latency-sensitive, and instantaneous dips in Wi-Fi throughput caused by BT eSCO and HID interruptions can result in performance degradation in the form of video stalls. FIG. 5 is a table showing that with a Wi-Fi link interference level of 20%, which is typical in many user environments, the percentage of the video call duration that is impacted by video stalls is unacceptably high.

The table in FIG. 5 also shows video call performance in terms of video stall percentage, with the proposed WiFi Limited Aggregation scheme enabled. It can be observed that video call performance improves significantly across the various WiFi link signal strength conditions that were tested. This is essentially caused by the WiFi radio making more efficient use of allocated airtime, by packing in more data bytes per transmitted packet (each physical layer packet has multiple MAC level MPDUs aggregated, per the limited aggregation algorithm). This helps to avoid large dips in WiFi throughput due to BT activity, and helps to meet the FaceTime application's latency requirements. In general, a video stall percentage>6% is considered a poor enough user experience to potentially cause a user to disconnect.

Figure 6:
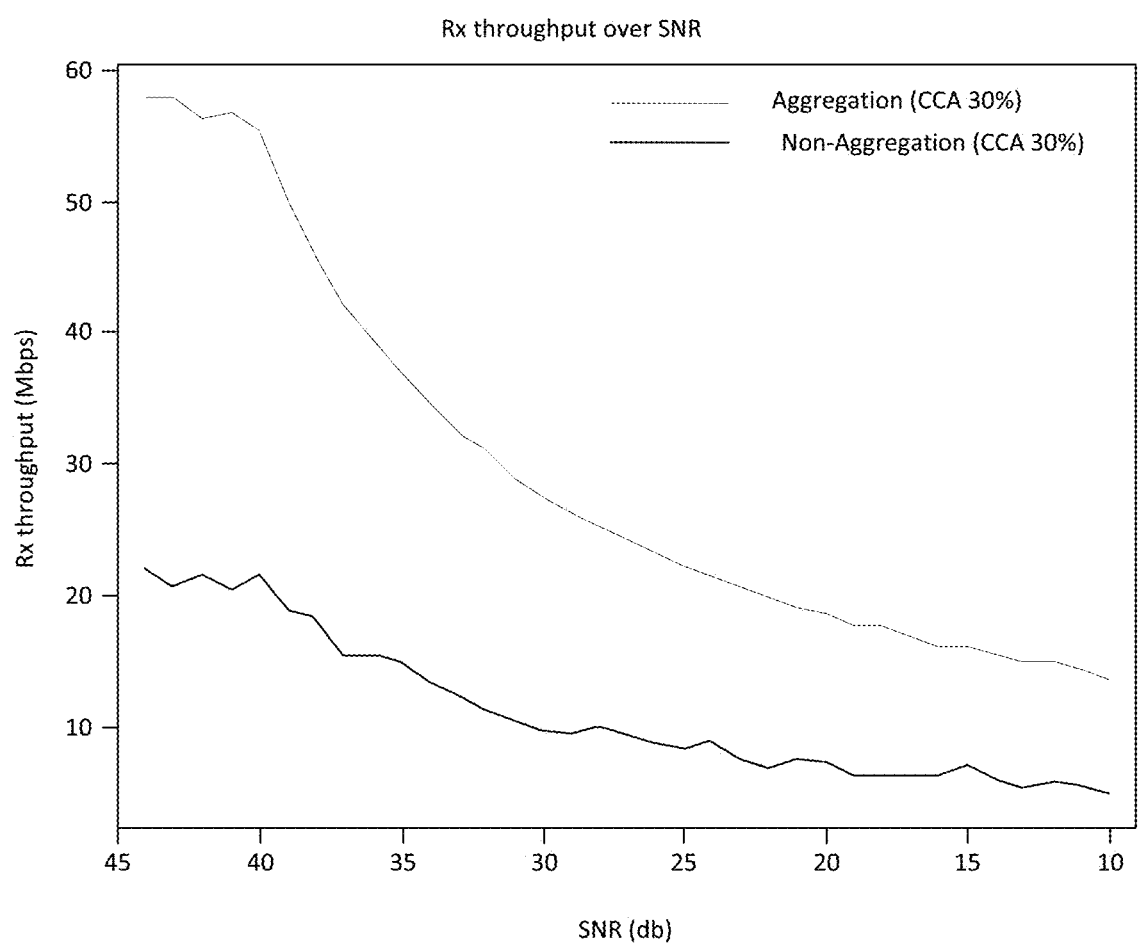
FIG. 6 illustrates an example comparison of WiFi Rx performance with limited aggregation on and off.

Accordingly, with limited aggregation, WiFi performance can be significantly improved as shown in FIG. 6, which shows a comparison of WiFi Rx performance with limited aggregation on and off. These are simulated results with WiFi MIMO 2×2, and includes Clear Channel Assessment (CCA) with 30% which is typical in office environment.

However, some APs may not comply with the 802.11 standard, which can cause regression. To avoid this problem, there are two options: In a first option, WiFi host software will check for the AP model, vendor of WiFi chipsets, and/or the firmware version of WiFi, and then based on the information and knowledge accumulated, a database can be built to list which AP can apply this feature. This can also be implemented in the WiFi driver based on the counters collected, such as a number of aggregation size the AP sends down versus the number of aggregations the device has required. If it does not match, the WiFi driver will fall back to non-aggregation mode.

The WiFi firmware, similar to the WiFi driver, can also detect critical counters and decide which is the best solution. For example, if the AP does not honor small aggregation size such as still blasting with big size aggregation or keep tear-down aggregation, the device can decide to fall back to aggregation off mode to minimize the regression.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method of aggregating wireless communications, the method comprising:
    determining, by a mobile computing device, that a WiFi communication in a first frequency band is associated with an antenna, the WiFi communication having a number of assigned transmission time slots;
    determining, by the mobile computing device, that a second wireless communication in a second frequency band also is associated with the antenna;
    determining, by the mobile computing device, a periodicity and a media quality of the second wireless communication; and
    determining, by the mobile computing device, a dynamic aggregation of the WiFi communication and the second wireless communication based on the periodicity and the media quality of the second wireless communication, the dynamic aggregation comprising assigning a number of packets of the second wireless communication to an aggregation frame of a plurality of frames associated with the transmission time slots assigned to the WiFi communication.

2. The method in accordance with claim 1, wherein the second wireless communication is in accordance with a Bluetooth protocol.

3. The method in accordance with claim 1, wherein the periodicity is compared with the transmission time slots assigned to the WiFi communication.

4. The method in accordance with claim 1, wherein the media quality is determined based at least on a received signal strength indicator of greater than 65 dBm.

5. The method in accordance with claim 1, wherein the media quality is determined based on a signal to noise ratio of greater than 25 dBm.

6. The method in accordance with claim 1, wherein the media quality is determined based on a clear channel assessment of less than 30%.

7. A mobile computing device comprising one or more processors configured to:
    determine that a WiFi communication in a first frequency band is associated with an antenna, the WiFi communication having a number of assigned transmission time slots;
    determine that a second wireless communication in a second frequency band also is associated with the antenna;
    determine a periodicity and a media quality of the second wireless communication; and
    determine a dynamic aggregation of the WiFi communication and the second wireless communication based on the periodicity and the media quality of the second wireless communication, the dynamic aggregation comprising assigning a number of packets of the second wireless communication to an aggregation frame of a plurality of frames associated with the transmission time slots assigned to the WiFi communication.

8. The mobile computing device in accordance with claim 7, wherein the second wireless communication is in accordance with a Bluetooth protocol.

9. The mobile computing device in accordance with claim 7, wherein the periodicity is compared with the transmission time slots assigned to the WiFi communication.

10. The mobile computing device in accordance with claim 7, wherein the media quality is determined based at least on a received signal strength indicator of greater than 65 dBm.

11. The mobile computing device in accordance with claim 7, wherein the media quality is determined based on a signal to noise ratio of greater than 25 dBm.

12. The mobile computing device in accordance with claim 7, wherein the media quality is determined based on a clear channel assessment of less than 30%.

13. A non-transitory computer-readable storage medium storing instructions executable by one or more processors of a first device, to cause the one or more processors to:
    determine that a WiFi communication with a second device in a first frequency band is associated with an antenna of the first device, the WiFi communication having a number of assigned transmission time slots;
    determine that a second wireless communication in a second frequency band also is associated with the antenna of the first device;
    determine a periodicity and a media quality of the second wireless communication; and
    aggregate the WiFi communication and the second wireless communication based on the periodicity and the media quality of the second wireless communication, the aggregation comprising assigning a number of packets of the second wireless communication to an aggregation frame of a plurality of frames associated with the transmission time slots assigned to the WiFi communication.

14. The non-transitory computer-readable storage medium in accordance with claim 13, wherein the second wireless communication is in accordance with a Bluetooth protocol.

15. The non-transitory computer-readable storage medium in accordance with claim 13, wherein the periodicity is compared with the transmission time slots assigned to the WiFi communication.

16. The non-transitory computer-readable storage medium in accordance with claim 13, wherein the media quality is determined based at least on a received signal strength indicator of greater than 65 dBm.

17. The non-transitory computer-readable storage medium in accordance with claim 13, wherein the media quality is determined based on a signal to noise ratio of greater than 25 dBm.

18. The non-transitory computer-readable storage medium in accordance with claim 13, wherein the media quality is determined based on a clear channel assessment of less than 30%.

* * * * *